United States Patent [19]

Hsing et al.

[11] Patent Number: 5,395,512
[45] Date of Patent: Mar. 7, 1995

[54] HYDROCARBON CRACKING PROCESS EMPLOYING ZEOLITE CATALYSTS WITH HYBRID [Al,B]-ZEOLITE ADDITIVES

[75] Inventors: Hsu-Hui Hsing, Nederland; Roy E. Pratt, Port Neches; Chih-Hao M. Tsang, Houston, all of Tex.; Chi-Lin O'Young, Poughkeepsie, N.Y.

[73] Assignee: Texaco Inc., White Plains, N.Y.

[21] Appl. No.: 60,634

[22] Filed: May 14, 1993

[51] Int. Cl.$^6$ .................. C10G 11/05; B01J 29/06
[52] U.S. Cl. ............................ 208/120; 502/67
[58] Field of Search ..................... 502/67; 208/120

[56] References Cited

U.S. PATENT DOCUMENTS

| | | | |
|---|---|---|---|
| 4,239,654 | 12/1980 | Gladrow et al. | 502/67 |
| 4,269,813 | 5/1981 | Klotz | 423/277 |
| 4,477,336 | 10/1984 | Scherzer | 208/120 |
| 4,549,956 | 10/1985 | Chu | 208/120 |
| 4,656,016 | 4/1987 | Taramasso et al. | 423/277 |
| 5,037,531 | 8/1991 | Bundens et al. | 208/120 |
| 5,059,302 | 10/1991 | Weinberg et al. | 208/91 |
| 5,106,485 | 4/1992 | Himpsl et al. | 208/120 |
| 5,187,132 | 2/1993 | Zones et al. | 502/67 |

*Primary Examiner*—Carl F. Dees
*Attorney, Agent, or Firm*—James L. Bailey; Kenneth R. Priem; Walter D. Hunter

[57] ABSTRACT

A hydrocarbon feedstock is catalytically cracked at an elevated temperature in a cracking zone with a zeolite cracking catalyst. The cracking catalyst employed comprises a crystalline aluminosilicate zeolite catalyst and a hybrid [Al,B]-zeolite catalyst. In this process the hydrocarbon feedstock is contacted with the zeolite catalyst in, for example, a fluidized bed catalytic cracking unit to yield cracked products containing increased amounts of $C_3/C_8$ olefins.

18 Claims, No Drawings

HYDROCARBON CRACKING PROCESS EMPLOYING ZEOLITE CATALYSTS WITH HYBRID [Al,B]-ZEOLITE ADDITIVES

This application is related to co-assigned application for Hydrocarbon Cracking Process Employing Zeolite Catalysts With Boron-Substituted Zeolite Additives of Hsing, et al., U.S. patent application 08/053,742 filed Apr. 29,1993.

BACKGROUND OF THE INVENTION

1. Field of the Invention

This invention relates to a process for catalytic cracking hydrocarbons comprising contacting a hydrocarbon feedstock at an elevated temperature in a cracking zone with a catalyst comprising a mixture of a conventional crystalline aluminosilicate zeolite, i.e., a FC (fluid cracking) catalyst and a hybrid [Al,B]-zeolite. The cracked product derived from the process of this invention contains increased amounts of $C_3$–$C_5$ olefins, particularly $C_5$ olefins. This invention is particularly applicable to fluid catalytic cracking (FCC) processes.

The recent passage of the Clean Air Act requires the petroleum industry to develop "clean" gasoline to meet future reformulated gasoline requirements. Fluid Catalytic Cracking Units, i.e., FCC units, will play an important role in achieving that goal by producing light olefins for alkylation and etherification processes. The increased olefin production provided by the process of this invention will further enhance FCC as a process to produce an environmentally acceptable fuel.

2. Prior Art

A number of fluid catalytic cracking processes are known in the art. State of the art commercial catalytic cracking catalysts for these processes are highly active and possess high selectivity for conversion of selected hydrocarbon charge stocks to desired products. With such active catalysts it is generally preferable to conduct catalytic cracking reactions in a dilute phase transport type reaction system with a relatively short period of contact between the catalyst and the hydrocarbon feedstock, e.g., 0.2 to 10 seconds.

The control of short contact times, optimum for state of the art catalysts in dense phase fluidized bed reactors is not feasible. Consequently, catalytic cracking systems have been developed in which the primary cracking reaction is carried out in a transfer line or riser reactor. In such systems, the catalyst is dispersed in the hydrocarbon feedstock and passed through an elongated reaction zone at relatively high velocity. In transfer line reactor systems, vaporized hydrocarbon cracking feedstock acts as a carrier for the catalyst. In a typical upflow riser reactor, the hydrocarbon vapors move with sufficient velocity to maintain the catalyst particles in suspension with a minimum of back mixing of the catalyst particles with the gaseous carrier. Thus development of improved fluid catalytic cracking catalysts has led to the development and utilization of reactors in which the reaction is carried out with the solid catalyst particles in a relatively dilute phase with the catalyst dispersed or suspended in hydrocarbon vapors undergoing reaction, i.e., cracking.

With such riser or transfer line reactors, the catalyst and hydrocarbon mixture passes from the transfer line reactor into a first separation zone in which hydrocarbon vapors are separated from the catalyst. The catalyst particles are then passed into a second separation zone, usually a dense phase fluidized bed stripping zone wherein further separation of hydrocarbons from the catalyst takes place by stripping the catalyst with steam. After separation of hydrocarbons from the catalyst, the catalyst is introduced into a regeneration zone where carbonaceous residues are removed by burning with air or other oxygen-containing gas. After regeneration, hot catalyst from the regeneration zone is reintroduced into the transfer line reactor into contact with fres hydrocarbon feed.

Commercial cracking catalysts for use in a fluidized catalytic cracking process which have been developed to be highly active for conversion of relatively heavy hydrocarbons into naphtha, lighter hydrocarbons and coke demonstrate selectivity for conversion of hydrocarbon feed, such as vacuum gas oil, to a liquid fuel fraction at the expense of gas and coke. One class of such improved catalytic cracking catalysts includes those comprising zeolitic silica-alumina molecular sieves in admixture with amorphous inorganic oxides such as silica-alumina, silica-magnesia and silica-zirconia.

U.S. Pat. No. 5,106,485 to Himpsi, et al., teaches a process for the catalytic cracking of gas oils to obtain gasoline wherein the gas oil is contacted in a fluid catalytic cracking unit at elevated temperatures with a mixture of zeolite Y and zeolite L in an inorganic matrix and wherein the zeolite L is present in an amount ranging from 1 to 10 wt. % based on the total catalyst composition.

U.S. Pat. No. 5,037,531 to Bundens, et al., teaches a process for catalytically cracking a hydrocarbon feedstock in which a zeolite-modified cracking catalyst having deposited thereon a treating agent selected from gallium and a gallium compound is employed.

U.S. Pat. No. 5,059,302 to Weinberg, et al., discloses a fluid catalytic cracking process in which the hydrocarbon feedstock is contacted with a particulate sorbent, such as calcined clay, and a particulate FCC catalyst, such as a Y zeolite zequentially in the same FCC riser followed by separation of the commingled spent catalyst and sorbent particles from the vapor and the subsequent primary partial regeneration of the spent sorbent particles and catalyst particles in an oxygen deficient burning zone.

U.S. Pat. No. 4,656,016 to Taramasso, et al., describes a process for preparing a synthetic, silica-based boron modified material selected from the group consisting of crystalline silica modified through the introduction of boron into the crystalline latice as a replacement element for silicon.

U.S. Pat. No. 4,269,813 discloses a crystalline borosilicate having the composition in terms of mole ratios of oxides:

$$0.9 \pm 0.2\ M_{2n}O:B_2O_3:YSiO_2:ZH_2O$$

where M is at least one cation, n is the valence of the cation, Y is a value within the range of 4 to about 600, and Z is a value within the range of 0 to about 160 and providing a specific X-ray diffraction pattern. The borosilicate is used to catalyze various processes, such as isomerization, disproportionation, and transalkylation.

SUMMARY OF THE INVENTION

This invention relates to a process for increasing the yield of $C_3$–$C_5$ olefins and particularly for isobutylene when hydrocarbon feedstocks are cracked in a cracking zone. Preferably, the process is conducted in a fluid catalytic cracking unit. In this catalytic cracking process a hydrocarbon feedstock is contacted at an elevated temperature and pressure in a cracking zone under cracking conditions with a catalyst comprising a conventional crystalline aluminosilicate zeolite and a hybrid [Al,B]-zeolite. The hybrid [Al,B]-zeolite catalyst composition utilized in this invention comprises at least one hybrid [Al,B]-zeolite. A binder of an inorganic oxide such as alumina, silica, silica-alumina, clays and combinations thereof can optionally be employed.

The hybrid [Al,B]-zeolites may be prepared by a process comprising the steps of:

(a) preparing a basic reaction mixture of at least about pH 9 comprising in suitable proportions a silicon source, an aluminum source, a boron source and an organic template;

(b) heating the reaction mixture in a closed vessel under conditions of temperature, autogenous pressure and time effective to produce a crystalline zeolite product containing boron oxide and aluminum oxide in the framework structure thereof;

(c) recovering the crystalline product; and (d) calcining the crystalline product under conditions effective to remove the organic template without substantial damage to the framework structure of the crystalline product.

To achieve the calcining effect which removes the organic template without damaging the crystal structure, the product is preferably subjected to at least one period of calcining in an inert atmosphere such as nitrogen, followed by at least one period of calcining in an atmosphere containing oxygen. The hybrid [Al,B]-zeolites can be converted to the hydrogen form by cation-exchanging with ammonium ion to remove sodium, then calcining to remove ammonia. The exchange step can be eliminated if only organic templates containing tetraalkyl ammonium ions are used as a base, and calcining drives off ammonia and organic residues, with hydrogen ions remaining.

DETAILED DESCRIPTION OF THE INVENTION

Conventional Crystalline Aluminosilicate Zeolite Cracking Catalysts

A wide variety of conventional crystalline aluminosilicate zeolite cracking catalysts can be employed in the process of this invention and in general, any of the cracking catalysts employed for the catalytic cracking of hydrocarbons Boiling over 400° F. (204° C.) in the absence of added hydrogen may be utilized. Such conventional zeolite cracking catalysts generally contain silica or silica-alumina, i.e., as binders or matrix associated with zeolitic materials. Generally, from 1 to 50%, usually from about 5 to about 20%, by weight of the catalyst will comprise crystalline zeolitic materials with the balance being an inorganic oxide binder. The zeolitic materials can be naturally occurring or synthetic materials.

The prior art describes a variety of synthetic zeolites. These zeolites are designated by letter or other convenient symbols, as illustrated in zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,19S); zeolite ZK-4 (U.S. Pat. No. 3,314,752; zeolite ZSM-11 (U.S. Pat. No. 3,709,979) and zeolite ZSM-23 (U.S. Pat. No. 4,076,842) merely to name a few.

The faujasitic or Y-type zeolites which can be utilized in this invention include, for example, ultrastable Y (USY) which is sometimes referred to as dealuminated Y (DAY). A partial list of references describing the nature and methods of preparation of USY or DAY, all of which are incorporated herein by reference, are: Maher, P. K., U.S. Pat. No. 3,293,192 and McDaniel, C. V., U.S. Pat. No. 3,607,403.

The matrices or binders utilized with the conventional crystalline aluminosilicate zeolite cracking catalysts are well known in the catalytic cracking art and include materials which are catalytically active or inactive and are generally inorganic oxides, especially those such as alumina or silica. Catalytically active inorganic oxides such as clay, chemically treated clay, silica, silica-alumina, etc., are particularly preferred because they can provide catalysts of superior porosity.

Hybrid [Al,B]-Zeolites

Hybrid [Al,B]-zeolites useful in this invention include medium to large pore zeolites containing silicon, aluminium and boron in the framework structures. In this application, a medium pore zeolite is one with a channel of at least about size greater than 5Å, while the large pore channels are greater than 5.6Å; the zeolite is preferably one with channels of 5.0 to 7.4Å. Typical materials of this structural type would include: mordenite, faujasite, X, Y, and L zeolites, mazzite, ZSM-5, ZSM-11, zeolite omega, zeolite beta, ZSM-20, NU-1 and gmelinite.

The medium to large pore boron zeolites useful in the present invention are preferably selected from the groups of topologically-related zeolite structures listed below in Table I and published in the *Atlas of Zeolite Structure Types* by Meier and Olson, published on behalf of the Structure Commission of the International Zeolite Association by Butterworths & Co., Ltd. (London, 1988), following rules set up by a Commission of Zeolite Nomenclature of the International Union of Pure and Applied Chemistry.

TABLE I

| FAU | MOR | MAZ | * |
| --- | --- | --- | --- |
| Faujasite | Mordenite | Mazzite | NU-1 |
| X (Linde) | Ptilolite | Omega | Beta |
| Y (Linde) | Zeolon | | |
| N–Y | | | |
| ZSM-20 | | | |

*No code assigned to this group.

Zeolite ZSM-20 is described in U.S. Pat. Nos. 3,972,983 and 4,021,331 and zeolite beta in U.S. Pat. Nos. 3,303,069 and Re. 28,341; zeolite L is disclosed in U.S. Pat. No. 3,216,789, zeolite omega is disclosed in U.S. Pat. No. 4,241,036, ZSM-4 is disclosed in U.S. Pat. No. 3,578,723, zeolite X is disclosed in U.S. Pat. No. 2,882,244 and zeolite Y is disclosed in U.S. Pat. No. 3,130,007. Reference is made to these patents for details of these zeolites, their preparation and properties. Many suitable forms of these zeolites can be employed, including variations in silica/alumina ratio, cell size and the like.

Synthesis of Hybrid [Al,B]-Zeolites

NU-1, Beta, ZSM-5, and ZSM-11 zeolites can be prepared by the same family of organic templates, tetraalkylammonium ions. The formation of each phase depends on the type of template used, on the reaction conditions, and on the gel composition. Table II below shows the types of zeolites and hybrid [Al,B]-zeolites which can be produced with tetraalkylammonium templates. ZSM-5 can be synthesized in the presence of TPA and TEA ions, while ZSM-11 can be synthesized in the presence of TBA ion. Both of these pentasil structures have frameworks containing two intersecting channel systems with 10-ring openings. For ZSM-11 the two channel systems are straight, but for ZSM-5 one channel is straight and the other one is zigzag or sinusoidal. See, e.g., Coudurier, et al., *J. Catalysis*, Vol. 108, p. 1 (1987).

NU-1 and Beta zeolites can be synthesized in the presence of TMA and TEA ions, respectively. The structure of Beta has been solved recently. It has an interconnected tunnel system with 12-ring openings. The structure of NU-1 is not clear, but it seems to have a dual pore system with 10-rings and 8-rings based upon adsorption results: reported by Dewing, et al., in *Catal. Rev. Sci. Eng.*, Vol. 27, pp. 461 (1985).

TABLE II

| Synthesis of Zeolites in the Presence of Tetraalkylammonium Ions | | |
|---|---|---|
| Template | (Al) zeolite | [Al,B]-zeolite |
| TMA | NU-1 | [Al,B]-NU-1 |
| TEA | Beta and ZSM-5 | [Al,B]-Beta |
| TPA | ZSM-5 | [Al,B]-ZSM-5 |
| TBA | ZSM-11 | [Al,B]-ZSM-11 |

TMA = tetramethylammonium ion,
TEA = Tetraethylammonium ion,
TPA = tetrapropylammonium ion, and
TBA = tetrabutylammonium ion.

When the hybrid [Al,B]-zeolites are prepared in the presence of organic cations they are initially catalytically inactive, possibly because the intra-crystalline free space is occupied by organic cations, from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of the zeolite but these cations do favor the formation of the desired crystal structure.

If desired, the zeolite crystallites may be bound together within a matrix comprising alumina, silica-alumina, clay or admixtures thereof. Normally, the finished catalyst would contain at least 10 up to about 85 weight percent of such a binder or matrix. The alumina which is used for the matrix material for the catalyst system of the present invention can be any suitable grade of crystalline or amorphous alumina. The alumina matrix should have a specific surface area of at least about 50 m$^2$/g, preferably in the range of from about 50 to about 500 m$^2$/g, and most preferably from about 100 to about 350 m$^2$/g.

Silica-alumina materials which can be used as binders can be prepared in the same manner as amorphous silica-alumina catalysts, e.g., by adding the zeolite component to a silica-alumina slurry, spray drying, washing the product and drying. Optionally, a clay diluent can be present in the silica-alumina slurry. Such matrixes can be prepared by admixing colloidal alumina (boehmite) and colloidal silica, allowing the matrix to vary over a wide range from catalytically inert to active. The activity, thermal stability, surface area and pore distribution of the matrix can be controlled by varying the amounts and particle size distributions of the respective colloids. Further guidance for the preparation of zeolite catalysts containing high porosity matrixes such as silica-alumina can be found in the section by Magee and Blazek on "Zeolite Cracking Catalysts" in ACS Monograph 171, *Zeolite Chemistry and Catalysts* (J. Rabo, ed.; Am. Chem. Soci., Wash., D.C. 1976).

The zeolite can also be composited, if desired, with a porous clay matrix material which has suitable binding properties and is resistant to the temperature and other conditions employed in the process. The composite is then calcined to confer the required physical strength. Naturally occurring clays can be composited with the zeolite and these clays can be used in the raw state as originally mined or initially subjected to calcination, acid treatment, chemical modification or purification.

Examples of suitable clays which can be used include the bentonite and kaolin families. Bentonites are mixtures of clays, mainly montmorillonites, which may also contain kaolinite clays. The Wyoming bentonires and montmorillonites are preferred because of their relatively high purity. Kaolin clays-include, for example, the Dixie, McNamee-Georgia and Florida clays and others in which the main mineral constituent is halloysite, kaolinite, dickite, nacrite, or anauxite. Other clays may also be found to be suitable for use in the present process.

The amount of clay or other matrix material relative to zeolite in the composite will determine, to a certain extent, the physical strength of the final catalyst, especially its attrition resistance and crushing strength. The mechanical properties of the catalyst can therefore be modified by appropriate choice of clay/zeolite ratio, with greater amounts of clay generally conferring better mechanical properties. Normally, the amount of zeolite will not exceed 50 percent by weight of the composite and in most cases it will not exceed 40 percent by weight and may be lower, e.g., 25 percent by weight or even 15 percent by weight.

The zeolite may conveniently be composited with the clay or other matrix materials by forming an aqueous slurry of the boron-substituted zeolite with the clay, spray drying the slurry to form microspheres and then calcining. The zeolite may be in the form of a gel. If the catalyst is to include more than one zeolite, the zeolite may form a cogel with themselves. If one of the zeolites in the zeolite combination is capable of being produced by treatment of a clay, the zeolite may be composited with the clay slurry and the slurry spray dried to form solid zeolite/clay microspheres which are then calcined to confer the desired strength. The clay in the composite may then be converted to the zeolite in the conventional way, e.g., by treatment with sodium hydroxide and heating, followed by ion-exchange, if desired. The mixing and homogenizing steps which may be used in the preparation of the zeolite-matrix mixtures are conventional and need not be described; the spray drying may also be carried out in the conventional manner.

One embodiment of the present invention is directed to a fluid catalytic cracking process wherein a hydrocarbon feedstock is contacted with the above-described modified cracking catalyst under cracking conditions to produce a cracked product. Such cracking operations are generally carried out at temperatures between 800° F. (427° C.) and about 1250° F. (677° C.) at pressures ranging from 5 to 50 psig. A preferred example of this embodiment of the invention utilizes a cyclic flow of catalyst between a riser cracking zone and a fluidized regeneration zone in a Fluid Catalytic Cracking Unit. Generally, the cracking catalyst is in particulate form and has a size within the range of from about 10 to 100 microns, preferably about 60 microns, where riser cracking is utilized. Generally, a hydrocarbon feedstock is introduced into a cracking zone under cracking conditions and contacted with the above-described modified cracking catalyst to produce an effluent containing cracked product and cracking catalyst having coke deposits thereon. The cracked products and unreacted feedstock are separated from the cracking catalyst, and the cracking catalyst is regenerated by contact with oxygen-containing gas under regeneration conditions to remove at least a portion of the coke from the cracking catalyst by combustion usually in a regeneration zone apart from the cracking zone. The thus regenerated cracking catalyst can then be recycled back to the cracking zone usually with supplementation by make-up catalyst for the cracking of additional hydrocarbon feedstock. Such a system is well known to those skilled in the art.

Specific conditions in the cracking zone and the regeneration zone of a fluid catalytic cracker depend on the feedstock used, the condition of the catalyst, and the products sought. In general, conditions in the cracking zone include:

TABLE III

| Temperature: | 427–677° C. (800–1250° F.), preferably 482–565° C. |
| Contact time: | 1–40 seconds, preferably 1–10 seconds. |
| Catalyst:oil ratio: | 3/1 to 30/1, by weight. |

Generally, in the cracking zone (i.e., in the riser cracking zone) the temperature of the process of this invention will range from about 800° to about 1250° F. and, preferably, from about 900° to about 1050° F. The feed preheat temperature usually will range from about 250° to about 700° F. while the regenerator temperature generally will range from 1100° to about 1400° F., The catalyst to oil ratio will generally vary from 3to 10 lb/lb, The pressure employed in the process of this invention will range from about 5 to 50 psig, A wide variety of hydrocarbon feedstocks can be processed using the catalytic cracking process of this invention. Typical hydrocarbon feedstocks include Feedstock A and Feedstock B the properties of which are shown in Table IV which follows,

TABLE IV

| FEED PROPERTIES | | |
|---|---|---|
| | FEED-STOCK A | FEED-STOCK B |
| API GRAVITY | 21.4 | 27.4 |
| ANILINE POINT, °F. | 163 | 169 |
| BROMINE NO. | 16.6 | 0.7 |
| WATSON AROMATICS, Wt % | 60.8 | 49.2 |
| X-RAY SULFUR, Wt % | 2.517 | 0.001 |
| BASIC N2, WPPM | 412 | 49.2 |
| TOTAL N2, WPPM | 1949 | — |
| MICRO CARBON RESIDUE, Wt % | 0.68 | 0.02 |
| DISTILLATION, °F. | D1160 | D1160 |
| IBP | 546 | 384 |
| 5 | 645 | 498 |
| 10 | 680 | 544 |
| 20 | 723 | 601 |
| 30 | 761 | 645 |
| 40 | 805 | 679 |
| 50 | 834 | 711 |
| 60 | 868 | 745 |
| 70 | 905 | 780 |
| 80 | 950 | 819 |
| 90 | 1003 | 888 |
| 95 | 1046 | 952 |
| EP | 1078 | — |

PREPARATION OF HYBRID [Al,B]-ZEOLITES

EXAMPLE 1

Synthesis of [Al,B]-ZSM-S Zeolite (Zeolite A)

50 g of Ludox ®AS40 was added slowly with vigorously stirring to a mixture of solution which contained 6.9 g of $H_3BO_3$, 1.4 g 20% alumina sol, 23.9 g of tetra-n-propylammonium bromide (TPABr), and 373.9 mL of water. The molar ratio of the gel mixture was:

$0.81((TPA)_2O), (B_2O_3), 0.05(Al_2O_3), 6(SiO_2), 400(H_2O)$

The pH of the solution was adjusted to 11.0 by adding ammonium hydroxide. The mixture was transferred to a Teflon liner and sealed in a steel autoclave which was kept in an oven at 195° C. for 7 days. After that it was cooled and its contents were filtered. The recovered white crystalline material was washed with copious amounts of water and was dried at 110° C. for 16 hours. The dried sample was calcined at 593° C. under nitrogen for 4 hours then air for another 2 hours. The calcined sample contains 40.0 Si, 0.35% B, and 0.60% Al. Powder XRD patterns of the zeolite are similar to those of MFI structure. The molar ratio of Si/B was 297 and the molar ratio of Si/Al was 69.

EXAMPLE 2

Synthesis of [Al,B]-ZSM-11 Zeolite (Zeolite B)

50 g of Ludox ® AS40 was added slowly with vigorously stirring to a mixture of solution which contained 1.38 g of $H_3BO_3$, 1.42 g 20% alumina sol, 34.11 g of 55% tetra-n-butylammonium hydroxide (TPAOH), and 293.87 mL of water. The molar ratio of the gel composition was:

$3.3((TBA)_2O), (B_2O_3), 0.25(Al_2O_3), 30(SiO_2), 810(H_2O)$

The pH of the solution was about 12.0 The mixture was transferred to a Teflon liner and sealed in a steel autoclave, after which the autoclave was kept in an oven at 195° C. for 3 days. After that it was cooled and its contents were filtered. The recovered white crystalline material, after washing with copious amounts of water, was dried at 110° C. for 16 hours. The dried sample was calcined at 593° C. under nitrogen for 4 hours then air for another 2 hours. Powder XRD patterns of the zeolite are similar to those of MEL structure.

The hybrid zeolites of this invention can be synthesized under the following conditions:

(1) The temperature of the hydrothermal synthesis can be 80 to about 220° C. with the time ranging from 1 to 30 days; the preferable temperature is 120 to about 200° C. and the preferable time is 3 to 7 days;

(2) The pH of the mixture can be 9 to 14; the preferable pH is 11 to 13;

(3) The silicon source can be colloidal silica, silicagel, sodium silicate, and organic derivatives of is silicon, such as tetraalkylsilicates;

(4) The boron source can be boric acid, sodium borate, borax, and organic derivatives of boron, such as trialkylborates;

(5) The aluminum source can be sodium aluminate ($NaAlO_2$), aluminum nitrate ($Al[NO_3]_3$), pseudo-boehmite ($A100H$), and organic derivatives of aluminum;

(6) The organic templates can be tetraalkylammonium ions, amines, and alcohols;

(7) If alkali salts were used in the synthesis, the zeolite will be in an alkali form. The zeolite call be converted to a hydrogen form by ion-exchange with ammonium salts one or more times followed by drying and calcination;

(8) The zeolite can be calcined under nitrogen, air inert gases or a combination of these gases. The calcination temperature can range from about 400° to 800° C.; preferable conditions are to calcine under nitrogen at a temperature of 550° to about 650° C. for about 4 hours and then under air for about 2 hours;

(9) The molar ratio of Si/B ranges from about 6 to about 1000 while the molar ratio of Si/Al ranges from 6 to about 1000;

(10) The reaction mixture should be as indicated by the formula below:

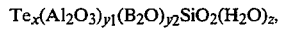

where for each mole of SiO, x is from 0.1 to 1, preferably 0.3 to 0.6; $y_1$ is from greater than 0 to 1.0, preferably from greater than 0 to 1.5; $y_2$ is from greater than 0 to 1.0, preferably from greater than 0 to 0.5; and z is from 10 to 200, preferably from 20 to 50.

EXAMPLE 3

In the process of this invention the additive catalyst, i.e., the hybrid [Al,B]-zeolite, is added to the FCCU unit along with fresh fluid cracking catalyst which is a crystalline aluminosilicate zeolite, such as a dealuminated Y zeolite, during the operation of the fluid catalytic cracking unit. The concentration of the hybrid [Al,B]-zeolite will range from about 0.5 to 10 wt % of the catalyst inventory of the unit.

Processing conditions in the FCCU unit under which the catalyst combination of this invention may be used include:

Riser Temperature (.i.e., the cracking zone temperature): 900°–1050° F.
Feed Preheat Temperature: 250°–750° F.
Catalyst/Oil Ratio: 3–10
Regenerator Temperature: 1100°–1400° F.

In this Example, two tests were carried out in the pilot unit. In the first test (Test A), a catalyst mixture consisting of 97 wt % of a commercial rare earth exchange USY (Ultrastable Y) zeolite and 3 wt % of a hybrid [Al,B]-ZSM-11 zeolite prepared as previously described in Example 2 was tested for cracking hydrocarbon feedstock in a Miniature Riser Pilot Unit which is a unit employed for evaluating fluid cracking catalysts (FCC). The hybrid additive, which has been spray dried, had the following composition:

| Hybrid [A1,B]-Zeolite A | 40 wt % |
| Clay | 40 wt % |
| Alumina | 20 wt % |

In the second test (Test B), prior to introduction into the pilot unit, the additive was thermally deactivated for 8 hours to simulate the equilibrium additive in a commercial unit, and the additive content used was increased to 4 wt %.

Experimental data was collected for both fresh and thermally deactivated hybrid additives: to demonstrate the invention and these data are set out in Table V which follows:

TABLE V

| | | | | | | |
|---|---|---|---|---|---|---|
| PRODUCT YIELDS WITH [A1,B]-ZSM-11 ADDITIVES | | | | | | |
| | FCC Cracking Without Additives | | Test A with [A1,B]-ZSM-11 | | Test B with [A1,B]-ZSM-11 (Thermal deactivation) | |
| Run Number | 924753 | 924755 | 924757 | 924758 | 914760 | 924761 |
| Riser Temp., F. | 960.00 | 1000.00 | 960.00 | 1000.00 | 960.00 | 1000.00 |
| [A1,B]-ZSM-11, wt % | 0 | 0 | 3.00 | 3.00 | 4.00 | 4.00 |
| Cat. Oil Ratio | 6.79 | 8.93 | 7.26 | 8.71 | 7.24 | 8.72 |
| CATCIR, G/HR | 6181.00 | 8108.00 | 6727.00 | 8044.00 | 6719.00 | 8043.00 |
| CONVERSION, Wt % | 69.05 | 74.08 | 69.33 | 73.24 | 68.96 | 74.35 |
| SELECTIVITY, Wt % | | | | | | |
| H2S | 1.23 | 1.41 | 1.40 | 1.40 | 1.51 | 1.46 |
| H2 | 0.14 | 0.16 | 0.15 | 0.16 | 0.14 | 0.15 |
| C1 | 1.17 | 1.50 | 1.23 | 1.46 | 1.25 | 1.49 |
| C2 | 0.85 | 1.18 | 0.90 | 1.12 | 0.91 | 1.15 |
| C2= | 0.79 | 1.06 | 0.84 | 1.06 | 0.89 | 1.07 |
| C3 | 1.04 | 1.34 | 1.17 | 1.29 | 1.22 | 1.35 |
| C3= | 4.31 | 5.67 | 4.92 | 5.81 | 4.99 | 5.98 |
| IC4 | 2.48 | 2.99 | 2.63 | 2.87 | 2.82 | 3.01 |
| SELECTIVITY, Wt % | | | | | | |
| IC4 | 2.48 | 2.99 | 2.63 | 2.87 | 2.82 | 3.01 |
| IC4= | 1.50 | 1.81 | 1.71 | 1.88 | 1.56 | 1.91 |
| NC4= | 3.75 | 4.65 | 4.04 | 4.88 | 4.12 | 4.73 |
| BUTADIENE | 0.04 | 0.04 | 0.06 | 0.06 | 0.04 | 0.04 |
| IC5 | 2.36 | 2.91 | 2.58 | 2.98 | 2.65 | 2.85 |
| NC5 | 0.28 | 0.36 | 0.28 | 0.32 | 0.26 | 0.25 |
| 3MB1 | 0.13 | 0.16 | 0.13 | 0.17 | 0.13 | 0.14 |
| TR-P2 | 1.17 | 1.23 | 1.10 | 1.23 | 1.10 | 1.22 |
| 2MB2 | 1.54 | 1.76 | 1.78 | 2.00 | 1.72 | 1.97 |
| 1-C5= | 0.49 | 0.51 | 0.44 | 0.49 | 0.48 | 0.48 |
| 2MB1 | 0.77 | 0.86 | 0.91 | 1.01 | 0.89 | 1.04 |
| CIS-P2 | 0.63 | 0.69 | 0.59 | 0.64 | 0.63 | 0.68 |
| C5== | 0.07 | 0.06 | 0.06 | 0.06 | 0.07 | 0.07 |

TABLE V-continued

PRODUCT YIELDS WITH [Al,B]-ZSM-11 ADDITIVES

|         | FCC Cracking Without Additives | | Test A with [Al,B]-ZSM-11 | | Test B with [Al,B]-ZSM-11 (Thermal deactivation) | |
|---------|-------|-------|-------|-------|-------|-------|
| C5-430  | 45.47 | 44.39 | 43.83 | 43.20 | 42.86 | 44.56 |
| C6-430  | 38.04 | 35.84 | 35.98 | 34.30 | 34.95 | 35.87 |
| 430-670 | 20.03 | 17.50 | 19.92 | 17.79 | 19.43 | 17.30 |
| 670+    | 10.93 | 8.42  | 10.75 | 8.97  | 11.61 | 8.36  |
| COKE    | 5.70  | 7.15  | 5.85  | 7.36  | 5.97  | 6.70  |

The data in Table V shows that the $C_3$–$C_5$ olefin yield increased with the addition of the hybrid [Al,B]-zeolite additives and that the additive was particularly effective in promoting the production of n-$C_5$ olefin and isoamylenes.

EXAMPLE 4

In this example three tests were conducted in which catalyst samples were tested for cracking hydrocarbon feedstock in a micro-activity testing (MAT) unit which is a unit for evaluating fluid cracking catalysts (FCC). In the first test (Test AA) the catalyst employed was commercial rare earth exchanged USY (ultrastable Y) zeolite; in the second test (Test BB) the catalyst consisted of 92 wt % of rare earth exchanged USY (ultrastable Y) zeolite and 8 wt % of a boron-substituted zeolite (i.e., [B]-ZSM-5 and in the third test (Test CC) the catalyst consisted of 92 wt % of the same rare earth exchanged USY (ultrastable Y zeolite) as in Test BB and 8 wt % of the hybrid [Al,B]-ZSM-5 catalyst of Example 1.

The test conditions were:
Catalyst wt. : 4 g
Temperature : 960° F.
Catalyst/Oil ratio : 3
WHSV : 30 h$^{-1}$
Feedstock : Feedstock B The conversion and yields for the catalyst with, and without additives are given below in Table VI.

TABLE VI

|                  | Test AA Without Additive | Test BB With [B]-ZSM-5 | Test CC With [Al,B]-ZSM-5 |
|------------------|-------|-------|-------|
| Conversion, wt % | 77.3  | 74.8  | 76.7  |
| Yields, wt %     |       |       |       |
| $H_2$            | 0.088 | 0.109 | 0.091 |
| Propylene        | 4.32  | 5.43  | 7.76  |
| Propane          | 0.92  | 1.01  | 2.13  |
| Isobutylene      | 0.85  | 1.22  | 1.57  |
| Butenes          | 4.39  | 4.95  | 5.11  |
| Isobutanes       | 4.99  | 5.21  | 6.82  |
| N-butane         | 0.87  | 0.8   | 1.22  |
| Naphtha          | 57.7  | 53.6  | 48.1  |
| Light Cycle Oil  | 18.74 | 20.95 | 19.25 |
| Heavy Cycle Oil  | 3.91  | 4.22  | 4.03  |
| Coke             | 1.73  | 1.77  | 1.86  |

The results above indicate that the use of both B-ZSM-5 and [Al,B]-ZSM-S-additives increased olefins as well as iso-olefins production. The incorporation of aluminum into the framework of B-ZSM-5 can further increase the additive acidity, thus its capability of increasing olefins and iso-olefins production over that achieved with the boron-substituted zeolite.

The boron-substituted ZSM-5 zeolite, i.e., the B-ZSM-5 zeolite, employed in Test BB of Table VI which had a Si/B weight ratio of about 44 was prepared as described in co-assigned application for Hydrocarbon Cracking Process Employing Zeolite Catalysts With Boron-Substituted Zeolite Additives of Hsing, et, al., U.S. application Ser. No. 08/053,742, filed Apr. 29, 1993, which is incorporated herein by reference in its entirety.

As previously mentioned, the properties for feedstocks used for both pilot plant and micro-activity test unit examples are given in Table IV. As shown, the feedstock quality for Feedstock B is significantly better than that of Feedstock A and is responsible for the significant differences in conversion and yields for the examples given above.

What is claimed is:

1. A process for catalytic cracking hydrocarbons comprising contacting a hydrocarbon feedstock at an elevated temperature in a cracking zone with a catalyst mixture comprising a conventional crystalline aluminosilicate zeolite catalyst and a hybrid [Al,B]-zeolite catalyst, said hybrid [Al,B]-zeolite being prepared by:

(a) preparing a basic reaction mixture of at least about pH 9 comprising a silicon source, a boron source, an aluminum source and an organic template.

(b) heating the reaction mixture in a closed vessel under conditions of temperature, autogenous pressure and time effective to produce a crystalline product containing boron and aluminum ions in the framework structure thereof;

(c) recovering the crystalline product; and (d) calcining the crystalline product under conditions effective to remove the organic template without substantial damage to the framework structure of the crystalline product.

2. The process of claim 1 wherein the catalyst mixture comprises about 0.5 to about 10 wt % of the hybrid [Al,B]-zeolite catalyst with the balance being the conventional crystalline aluminosilicate zeolite catalyst.

3. The process of claim 1 wherein the catalytic cracking is carried out in a fluid catalytic cracking unit.

4. The process of claim 1 wherein the said conventional crystalline aluminosilicate zeolite is an ultrastable Y zeolite.

5. The process of claim 1 wherein in the said conventional crystalline aluminosilicate zeolite catalyst the zeolite component is incorporated in an inorganic matrix.

6. The process of claim 1 wherein in the said hybrid [Al,B]-zeolite catalyst the zeolite component is incorporated in an inorganic matrix.

7. The process of claim 1 wherein the said hybrid [Al,B]-zeolite catalyst is characterized by a topological structure selected from the group consisting of ZSM-5, ZSM-11, NU-1, Beta, FAU and mordenite.

8. The process of claim 1 wherein the said hybrid [Al,B]-zeolite catalyst is characterized by the topological structure of ZSM-5.

9. The process of claim 1 wherein the said hybrid [Al,B]-zeolite catalyst is characterized by the topological structure of ZSM-11.

10. The process of claim 1 wherein the hybrid [Al,B]-zeolite catalyst is characterized by the topological structure of ZSM-5 and wherein the hybrid zeolite has a Si/B molar ratio of about 1000:1.

11. The process of claim 1 wherein the hybrid [Al,B]-zeolite is characterized by the topological structure of ZSM-5, wherein the hybrid zeolite has a Si/Al molar ratio of about 6 to about 1000:1 and wherein the conventional crystalline aluminosilicate zeolite catalyst is an ultrastable Y zeolite.

12. The process of claim 1 wherein the hybrid [Al,B]-zeolite catalyst is characterized by a topological structure of ZSM-11 and wherein the hybrid zeolite has a Si/B molar ratio of about 1 to about 1000:1.

13. The process of claim 1 wherein the hybrid [Al,B]-zeolite is characterized by the topological structure of ZSM-11, wherein the hybrid zeolite has a Si/Al molar ratio of about 6 to about 1000:1 and wherein the conventional crystalline zeolite catalyst is an ultrastable Y zeolite.

14. A process for catalytic cracking hydrocarbons comprising contacting a hydrocarbon feedstock at an elevated temperature in a cracking zone with a catalyst mixture comprising a conventional crystalline aluminositicate zeolite catalyst and a hybrid [Al,B]-zeolite catalyst wherein the catalyst mixture comprises about 0.5 to about 10 wt. % of the hybrid [A,B]-zeolite catalyst with the balance being the conventional crystalline aluminosilicate zeolite catalyst.

15. The process of claim 14 wherein the hybrid [Al,B]-zeolite is characterized by the topological structure of ZSM-11, wherein the hybrid zeolite has a Si/Al molar ratio of about 6 to about 1000:1 and wherein the conventional crystalline zeolite catalyst is an ultrastable Y zeolite.

16. The process of claim 14 wherein the hybrid [Al,B]-zeolite is characterized by the topological structure of ZSM-5, wherein the hybrid zeolite has a Si/Al molar ratio of about 6 to about 1000:1 and wherein the conventional crystalline aluminosilicate zeolite catalyst is an ultrastable Y zeolite.

17. The process of claim 14 wherein the hybrid [Al,B]-zeolite is characterized by the topological structure of ZSM-11, wherein the hybrid zeolite has a Si/Al molar ratio of about 6 to about 1000:1 and wherein the conventional crystal line aluminosilicate zeolite catalyst is a rare earth exchanged ultrastable Y zeolite.

18. The process of claim 14 wherein the catalytic cracking is carried out in a fluid catalytic cracking unit.

* * * * *

UNITED STATES PATENT AND TRADEMARK OFFICE
CERTIFICATE OF CORRECTION

PATENT NO. : 5,395,512
DATED : Mar. 7, 1995
INVENTOR(S) : Hsu-Hui Hsing, Roy E. Pratt, Chih-Hao M. Tsang, Chi-Lin O'Young It is certified that error appears in the above-indentified patent and that said Letters Patent is hereby corrected as shown below:

Column 13,

In Claim 10, line 4, after "about", insert —6 to—

Column 14,

In Claim 17, line 5, after " conventional" delete " crystal line" and insert therefor --crystalline-- .

Signed and Sealed this

Twenty-seventh Day of June, 1995

Attest:

BRUCE LEHMAN

Attesting Officer     Commissioner of Patents and Trademarks